(12) United States Patent
Evans et al.

(10) Patent No.: US 6,466,656 B1
(45) Date of Patent: Oct. 15, 2002

(54) SYSTEM EMPLOYING XDSL SPECTRUM RELOCATION

(75) Inventors: Gregory M. Evans; Roger L. Embry, both of Raleigh; Brent W. Lamm, Bailey; Bryan H. McChesney, III; Patrick T. McElwee, both of Raleigh, all of NC (US)

(73) Assignee: ECI Telecom Ltd., Petach Tikva (IL)

(*) Notice: Subject to any disclaimer, the term of this patent is extended or adjusted under 35 U.S.C. 154(b) by 0 days.

(21) Appl. No.: 09/324,842

(22) Filed: Jun. 3, 1999

Related U.S. Application Data
(60) Provisional application No. 60/110,544, filed on Dec. 2, 1998.

(51) Int. Cl.[7] .............................................. H04M 11/00
(52) U.S. Cl. .............................. 379/93.07; 379/90.01; 375/220; 370/490
(58) Field of Search ............... 379/90.01, 93.05–93.09, 379/93.14, 399.01, 413.02; 375/220, 219; 370/464, 465, 485, 490

(56) References Cited

U.S. PATENT DOCUMENTS

| | | | |
|---|---|---|---|
| 5,247,347 A | 9/1993 | Litteral | 358/85 |
| 5,495,483 A | 2/1996 | Grube et al. | 370/95.1 |
| 5,613,190 A | 3/1997 | Hylton | 455/3.1 |
| 5,644,573 A | 7/1997 | Bingham et al. | 370/503 |
| 5,668,857 A | 9/1997 | McHale | 379/93.07 |
| 5,742,527 A | 4/1998 | Rybicki et al. | 364/705.05 |
| 5,781,728 A | 7/1998 | Rybicki et al. | 395/200.6 |
| 5,812,786 A | 9/1998 | Seazholtz et al. | 395/200.63 |
| 6,314,102 B1 * | 11/2001 | Czerwiec et al. | 379/93.01 |

* cited by examiner

Primary Examiner—Wing F. Chan
(74) Attorney, Agent, or Firm—Nath&Associates PLLC; Harold L. Novick

(57) ABSTRACT

A coaxial-based communication system connects network-side xDSL services to xDSL CPE devices and avoids interference from a noise spectrum that is degrading to xDSL performance or emission compliance on either the network or customer premises sides on the NID. The system provides an NID and a CPE interface device at the two ends of the coaxial wiring to perform a spectral relocation of the xDSL signal to a lower noise frequency band than is used for the xDSL service. Interfaces to the system are industry standard xDSL, POTS, and CATV services, while the transport medium is the normal coaxial type wiring and CATV splitters found on the customer premise.

30 Claims, 7 Drawing Sheets

SYSTEM EMPLOYING XDSL SPECTRUM RELOCATION

This application claims the benefit of U.S. Provisional Application No. 60/110,544, filed Dec. 2, 1998.

FIELD OF THE INVENTION

The invention relates generally to a digital subscriber loop (DSL) system which utilizes un-shielded twisted pair (UTP) or shielded twisted pair (STP) for network connection to customer premises equipment (CPE) through a network interface device (NID) and standard (i.e., in-home) wiring using coaxial cable for CATV and UTP for Plain Old Telephone Service (POTS). The invention also relates to a DSL system which uses a passive NID-based end station and an active CPE-based end station for spectrally relocating xDSL frequency signals to lower noise locations on customer premises wiring.

BACKGROUND OF THE INVENTION

Digital subscriber loop signaling (e.g., ADSL, HDSL, VDSL and so on which are hereinafter generally referred to as xDSL) provides a method for high speed data transfer across existing telephone lines. Plain Old Telephone Service (POTS) transmission occurs in a frequency range of approximately 0 Hz to 4 kHz. xDSL utilizes a higher set of frequencies from 20 kHz to 1.1 MHz. Using a different frequency band gives xDSL several advantages over current analog modem technology. For example, fast data transmission downstream from the network to the user is achieved (e.g., on the order of 8 Mb/s), as well as improved data transmission speed upstream from the user to the network (e.g., on the order of 640 kb/s). In addition, xDSL allows simultaneous data transfer in both directions (i.e., upstream and downstream) and does not interfere with telephone transmissions. Thus, both telephone and xDSL transmissions can occur simultaneously.

xDSL gains these advantages over current technology in a relatively simple manner. As mentioned earlier, xDSL utilizes a higher frequency band than POTS. This higher frequency band of 20 kHz to 1.1 MHz is divided into two sections, that is, one for upstream data and one for downstream data. Thus, xDSL is able to allow data transfer in both directions at the same time. FIG. 1 depicts the manner in which the frequency spectrum can be divided for POTS and xDSL. The upstream data spectrum 12 ranges from 20 kHz to 160 kHz, for example, and the downstream data spectrum 10 ranges from 240 kHz to 1.1 MHz. In accordance with xDSL, the upstream and downstream spectrums 12 and 10 are further divided into 256 4.3 kHz blocks. These blocks are referred to as "tones". The downstream spectrum 10 contains more tones and thus has the capability of transmitting data faster. The reason for further dividing the spectrums into tones is so that, if interference noise exists at a certain frequency and the data associated with the tone at that frequency is being destroyed, an xDSL system can refuse to transmit data on that tone. The system will then use a different tone to transmit the data safely. If this should occur, the xDSL system does not transmit data at its maximum rate; however, data integrity is high. When an xDSL system is first powered on, the system checks all of the tones available in the frequency spectrums 10 and 12 to see if data can be transferred on each tone. If the system finds that a sufficient number of good tones are available, the system is said to be "trained", and data can be transmitted.

With this new DSL technology, new problems have also arisen. A problem with xDSL transmissions which is currently foreseeable in virtually all residential and commercial facilities is noise. Essentially all of these facilities have electronic devices (e.g., motor driven devices and variable switches) which generate noise in the form of electromagnetic interference (EMI). Additional examples of these electronic devices include TRIAC devices found in light dimmers and hair-dryers, and brushes in electric motors located in ceiling fans and air-compressors in refrigerators, heat-pumps, and so on. This noise is generated in a frequency range of approximately 10 kHz to 5 MHz, encompassing the entire xDSL spectrum. This poses a problem with existing unshielded twisted pair copper telephone lines because the household EMI noise couples onto these telephone lines and can potentially destroy any xDSL transmission. If the EMI noise is very severe, other network xDSL subscribers may also be degraded from crosstalk in the network feeder cable's binder group.

A need therefore exists for a method that relocates the xDSL sign spectrum away from the most severe EMI noise spectrums located on the customer premises. Shifting the frequency range of the xDSL transmission above the EMI noise range, however, also poses problems. Existing unshielded twisted pair telephone lines have a frequency response similar to a low-pass filter. If the xDSL frequency range were shifted up above the EMI noise range, much of the transmission could be lost due to the low-pass filter effects of the twisted pair telephone lines. The problem also increases as the length of the telephone line increases. As the length of the telephone line increases, the cutoff frequency of the telephone line decreases, which increases the amount of data that could be lost. A need exists for an xDSL system which addresses and solves this problem, as well.

In addition, when an xDSL set-top service is supplied for Video On Demand (VOD) within a customer's premises, the connection is specified to be UTP or STP. The CPE connection from the network interface device (NID) to the television (TV) or set-top box, however, is typically coaxial. A method is needed to reuse the existing customer premises coaxial wiring to deliver the xDSL service from the NID to the xDSL set-top box.

Also, UTP wiring within the customer premises is an uncontrolled element to the network provider. This uncontrolled element has the potential to radiate an xDSL signal much like an antenna radiates a signal, thereby violating FCC emission limits. A method is needed to isolate the existing POTS wiring from the network without having to install a dedicated drop for the xDSL service.

SUMMARY OF THE INVENTION

In order to keep EMI noise from potentially destroying an xDSL transmission, an xDSL spectrum relocation system is provided in accordance with the present invention which shifts the frequency range of an xDSL transmission above the EMI noise range. Also, to solve the problem of the low-pass filter characteristics of the existing twisted pair telephone lines, the system of the present invention utilizes the existing coaxial cable TV lines within the house.

The xDSL spectrum relocation system of the present invention shifts signals from one form of wire to another. With the implementation of xDSL, the incoming telephone line to a house carries both POTS and xDSL transmissions. The xDSL signal is removed from an upstream telephone line and then shifted up in frequency using amplitude modulation (AM) to approximately 25 MHz, which is well above the household EMI noise range. Amplitude modulation essentially uses the amplitude of the data signal to vary the amplitude of a carrier signal. Thus, the data and carrier signals appear to be one signal being transmitted at the frequency of the carrier. This signal is then placed on coaxial cable at a NID with the existing cable TV signals. Since existing cable TV frequencies begin at about 50 MHz, there is no interference between the two signals.

Because the existing standard for xDSL does not involve signals outside a selected frequency range (e.g., signals outside a range between 20 kHz and 1.1 MHz), the signal from the coaxial cable is demodulated after it has been transmitted through the house without being affected by EMI noise. Thus, the signal is removed from the coaxial cable, demodulated and placed back on twisted pair telephone line so that the existing xDSL modems can accept the signal.

The system of the present invention comprises two devices located at the customer premises which provide spectrum relocation of xDSL signals. Other cable and active xDSL devices do not require modification. The first device is a spectrum relocating NID which can be substituted for an existing POTS ND and the existing CATV NID. This four-port device provides two network side connections and two customer premises connections. The four-port NID device supports a number of features and functions such as: a spectrally band-limited (i.e., for POTS and xDSL) UTP port for connection to the public network; a spectrally band-limited (I.e., for broadcast CATV and upstream pay-per-view PPV signaling coaxial port for connection to the public CATV provider network; a spectrally band-limited (i.e., for POTS only) MPT port for connection to existing customer premises POTS wiring; a spectrally band-limited (i.e., for CATV, PPV signaling, and relocated xDSL) coaxial port for connection to existing customer premises coaxial wiring, a function to relocate the downstream xDSL signal (i.e., a network-to-CPE signal) from its normal spectral location on the network side UTP port to an unused spectral location between 5 and 30 MHz on the customer premises side coaxial port; a function to relocate the upstream xDSL signal (Le., a CPE-to-network signal from an unused spectral location between 5 and 30 MHz on the customer premises side coaxial port to its normal xDSL spectral location on the network side UTP port; a function to pass through the POTS signal between the UTP ports on the network and customer premises sides; and a function to pass through the CATV signals (i.e., downstream and PPV upstream signals) between the coaxial ports on the network and customer premises sides. All conventional NID functions such as grounding and surge protection provided by existing types of POTS and CATV NIDs are provided by the new four-port NID.

The second spectrum relocating device of the present invention is a CPE interface device co-located with an existing CPE xDSL device such as a personal computer (PC) network interface card (NIC), an xDSL modem, or an xDSL VOD set-top box. The CPE interface device supports a number of features and functions such as: a spectrally band-limited (i.e., for xDSL only) UTP port for connection to the CPE xDSL termination device; a spectrally band-limited (i.e., for CATV, PPV upstream, and relocated xDSL signaling) coaxial port for connection to customer premises existing coaxial wiring; a spectrally band-limited (Le., for broadcast CATV and PPV upstream signaling) coaxial port for connection to a co-located TV or existing set-top device; a function to relocate the downstream (network-to-CPE) xDSL signal from its relocated spectral position between 5 and 30 MHz on the customer premises coaxial port to its normal spectral position on the UTP port connecting to the xDSL CPE device; a function to relocate the upstream xDSL signal (i.e., a CPE-to-network signal from its normal xDSL spectral position on the UTP port connecting to the xDSL CPE device to an unused spectral location between 5 and 30 MHz on the customer premises coaxial port; a function to provide a carrier signal between 5 and 30 MHz over the customer premises coaxial wiring to be used by the NID to obtain power and local oscillator function for frequency relocation; a function to pass through the CATV signals (i.e., downstream and PPV upstream signals) between the coaxial ports for the customer premises coaxial wiring and the co-located TV or set-top device; and a standard UL compliant AC (117 volts and 60 Hz) power connection.

By shifting of the xDSL spectrum to a lower noise frequency band on the in-home coaxial wiring, the above-mentioned problem areas are minimized. Also, by keeping the NID device simple and mostly passive, high reliability and low cost can be achieved, thereby meeting the traditional design goals of NIDs owned by the Public Switched Network (PSN).

BRIEF DESCRIPTION OF THE DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 1:
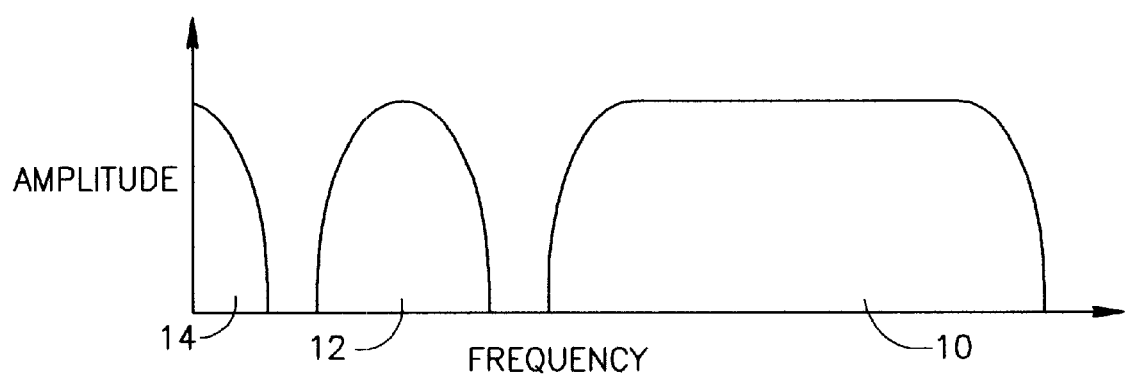
FIG. 1 illustrates exemplary frequency spectra of POTS and xDSL signals.
Figure 2:
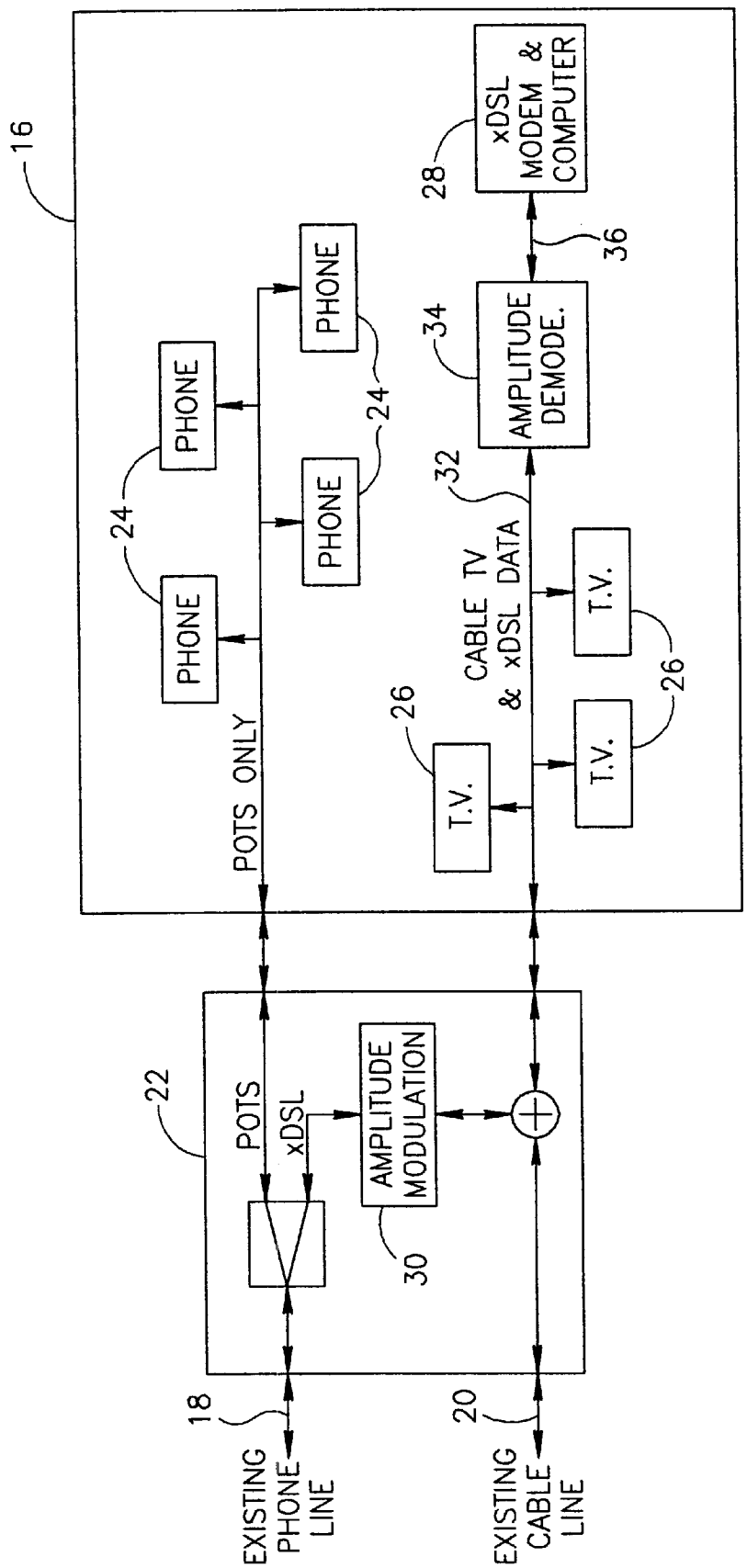
FIG. 2 is a block diagram of an NID and customer premises equipment configured in accordance with an embodiment of the present invention to relocate the frequency spectrum of xDSL signals.

Exemplary customer premises 16 having POTS and xDSL is depicted in FIG. 2. A conventional telephone line 18 and a conventional coaxial cable 20 are connected to the customer premises via an NID 22. The customer premises 16 can comprise a number of telephone devices which are each indicated at 24. The customer premises 16 can also comprise a number of cable television (CATV) devices indicated at 26 and an xDSL device 28 which are connected to coaxial cable.

Figure 3:
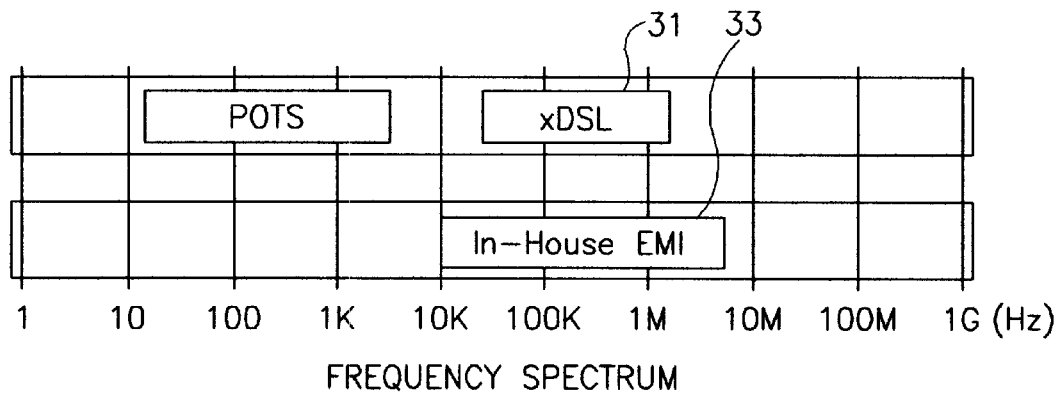
FIG. 3 depicts an overlap in the frequency spectrum of customer premises EMI and xDSL signals.
Figure 4:
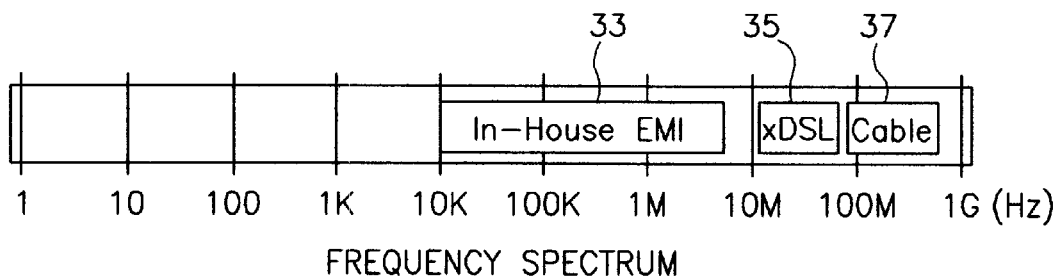
FIG. 4 depicts relocation of the xDSL frequency spectrum in accordance with an embodiment of the present invention.

The xDSL spectrum relocation system of the present invention shifts signals from one type of signal conductor to another. With the implementation of xDSL, the incoming telephone line 18 to a house carries both POTS and xDSL transmissions. Many of the problems associated with xDSL transmissions arise because of an overlap in frequency ranges between transmission signals and EMI noise. The xDSL signal is removed from the telephone line 18 and then shifted up in frequency using amplitude modulation (AM) 30 to approximately 25 MHz, for example, and therefore above the typical household EMI noise range. FIG. 3 depicts overlaps between xDSL 31 and EMI 33. FIG. 4 illustrates how the xDSL spectrum relocation system of the present invention avoids these interference problems by relocating the xDSL spectrum 35 above EMI 33.

With continued reference to FIG. 2, an amplitude modulator 30 essentially uses the amplitude of the data signal to vary the amplitude of a carrier signal Thus, the data and carrier signals appear to be one signal being transmitted at the frequency of the carrier. This signal is then placed on coaxial cable 32 with the existing cable TV signals 37 (FIG. 4). Since existing cable TV frequencies begin at about 50 MHz, there is no interference between the two signals. Because the existing standard for xDSL does not involve signals which are beyond a selected frequency range (e.g., outside a range between 20 kHz and 1.1 MHz), the signal from the coaxial cable is demodulated, as indicated at 34 in FIG. 2, after it has been transmitted through the house without being affected by EMI noise. Thus, the signal is removed from the coaxial cable, demodulated and placed back on twisted pair telephone line 36 so that the existing xDSL modem 28 can accept the signal.

As stated previously, the xDSL spectrum is shifted down in frequency so that the xDSL modem 28 is able to accept and process the information. Once the xDSL data has been relocated to its original frequency spectrum location 31, the xDSL data is once again susceptible to noise. The overlap between EMI 31 and xDSL 33 data depicted in FIG. 3 may once again be present Since the xDSL data travels only a relatively short distance (e.g., a few feet) on unshielded twisted pair telephone line before reaching the xDSL modem 28, very little noise will be able to couple onto the telephone line 36. Therefore, the xDSL data can reach the modem 38 uncorrupted by noise such as household EMI. Thus, by using the xDSL spectrum relocation system, the user has more tones available to transmit and receive data, and can therefore transmit and receive data much faster than conventional data transmission systems.

Figure 5:
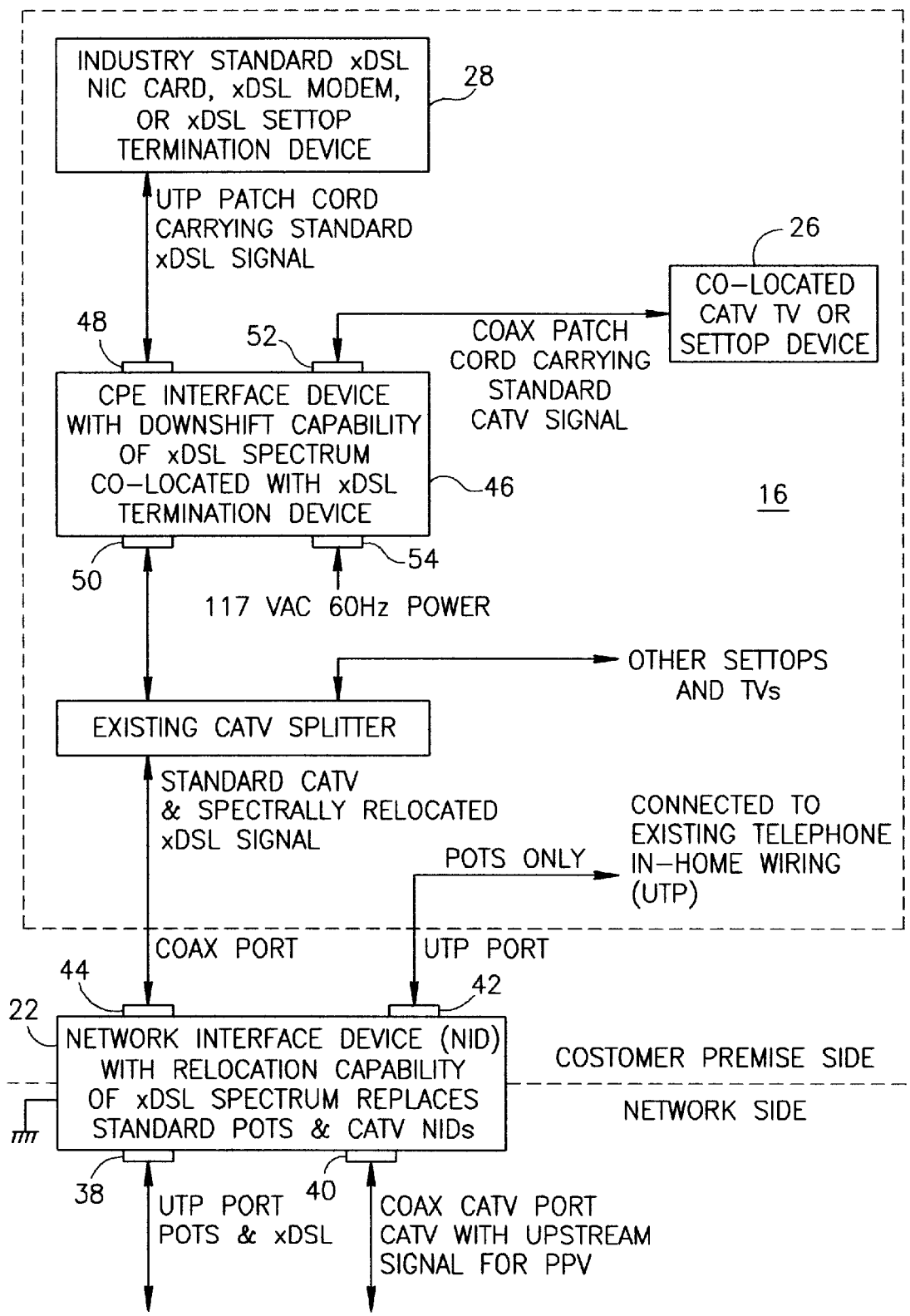
FIG. 5 is a block diagram of NID and CPE devices constructed in accordance with an embodiment of the present invention to employ spectral relocation of xDSL signals.

With reference to FIG. 5, the xDSL spectrum relocation system of the present invention comprises two devices located at the customer premises 16 which provide spectrum relocation of xDSL signals. Other cable and active xDSL devices do not require modification. The first device is a spectrum relocating NID 22 which provides for the frequency relocation of an xDSL spectrum in accordance with the present invention, and which can be substituted for an existing POTS NID and an existing CATV NID. This four-port device provides two network side connections and two customer premises connections. The four-port NID device supports a number of features and functions such as: a spectrally band-limited (i.e., for POTS and xDSL) UTP port 38 for connection to the public switched network; a spectrally band-limited (i.e., for broadcast CATV and upstream pay-per-view (PPV) signaling coaxial port 40 for connection to the public CATV provider network; a spectrally band-limited (i.e., for POTS only) UTP port 42 for connection to existing customer premises POTS wiring and POTS devices; and a spectrally band-limited (i.e., for CATV, PPV signaling, and relocated xDSL) coaxial port 44 for connection to existing customer premises coaxial wiring and corresponding devices. The NID 22 relocates the downstream xDSL signal (i.e., a network-to-CPE signal) from its normal spectral location on the network side UTP port 38 to an unused spectral location between, for example, 5 and 30 MHz on the customer premises side coaxial port 44. The NID 22 also relocates the upstream xDSL signal (i.e., a CPE-to-network signal) from an unused spectral location between, for example, 5 and 30 MHz on the customer premises side coaxial port 44 to its normal xDSL spectral location on the network side UTP port 38. In addition, the NID 22 passes POTS signals between the UTP ports 38 and 42 on the network and customer premises sides, respectively. The NID 22 also passes through the CATV signals (i.e., downstream and PPV upstream signals) between the coaxial ports 40 and 44 on the network and customer premises sides, respectively. Conventional NID functions such as grounding and surge protection are preferably provided by the NID 22 in the same manner as existing types of POTS and CATV NIDs.

The second spectrum relocating device of the present invention is a CPE interface device 46 which is co-located at the customer premises 16 with an existing CPE xDSL device 28 such as a PC NIC, an xDSL modem, or an xDSL VOD set-top box. The CPE interface device 46 supports a number of features and functions such as: a spectrally band-limited (i.e., for xDSL only) UTP port 48 for connection to the CPE xDSL termination device 28; a spectrally band-limited (i.e., for CATV, PPV upstream, and relocated xDSL signaling) coaxial port 50 for connection to customer premises existing coaxial wiring, and a spectrally band-limited (i.e., for broadcast CATV and PPV upstream signaling coaxial port 52 for connection to a co-located TV or existing set-top device 26. The CPE interface device 46 of the present invention relocates the downstream (network-to-CPE) xDSL signal from its relocated spectral position between 5 and 30 MHz, for example, on the customer premises coaxial port 50 to its normal spectral position on the UTP port 48 connecting to the xDSL CPE device 28. The CPE interface device 46 relocates the upstream xDSL signal (i.e., a CPE-to-network signal) from its normal xDSL spectral position on the UTP port 48 connecting to the xDSL CPE device to an unused spectral location between 5 and 30 MHz, for example, on the customer premises coaxial port 50. The CPE interface device 46 also provides a carrier signal between 5 and 30 MHz over the customer premises coaxial wiring to be used by the NID 22 to obtain power and local oscillator function for frequency relocation. The CPE interface device 46 passes through the CATV signals (e.g., downstream and PPV upstream signals) between the coaxial ports 50 and 52 for the customer premises coaxial wiring and the co-located TV or set-top device, respectively. A standard UL compliant AC (117 volts and 60 Hz) power connection 54 is provided.

The NID

Figure 6:
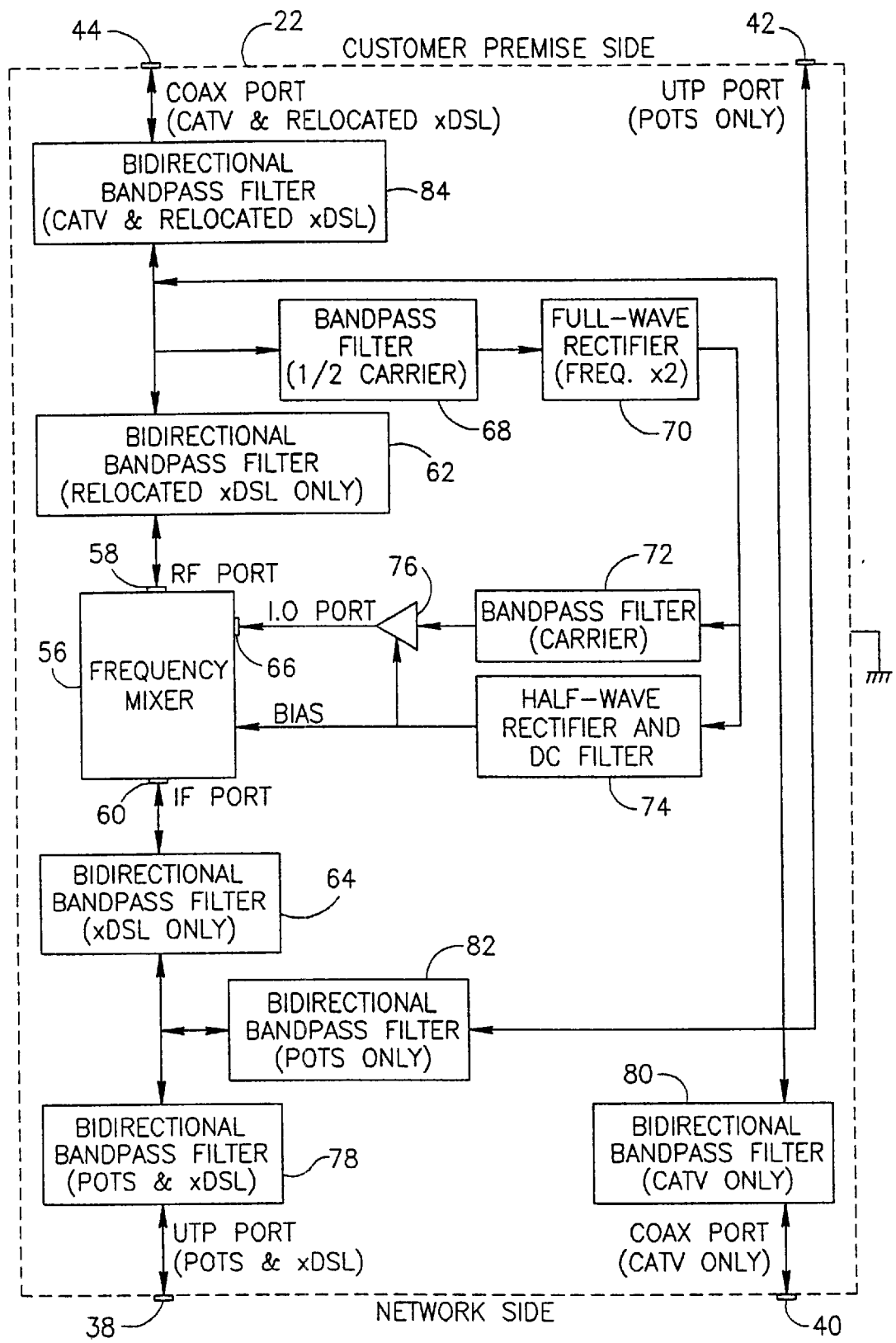
FIG. 6 is a block diagram of a network interface device constructed in accordance with an embodiment of the present invention to provide spectral relocation of xDSL signals.
Figure 7:
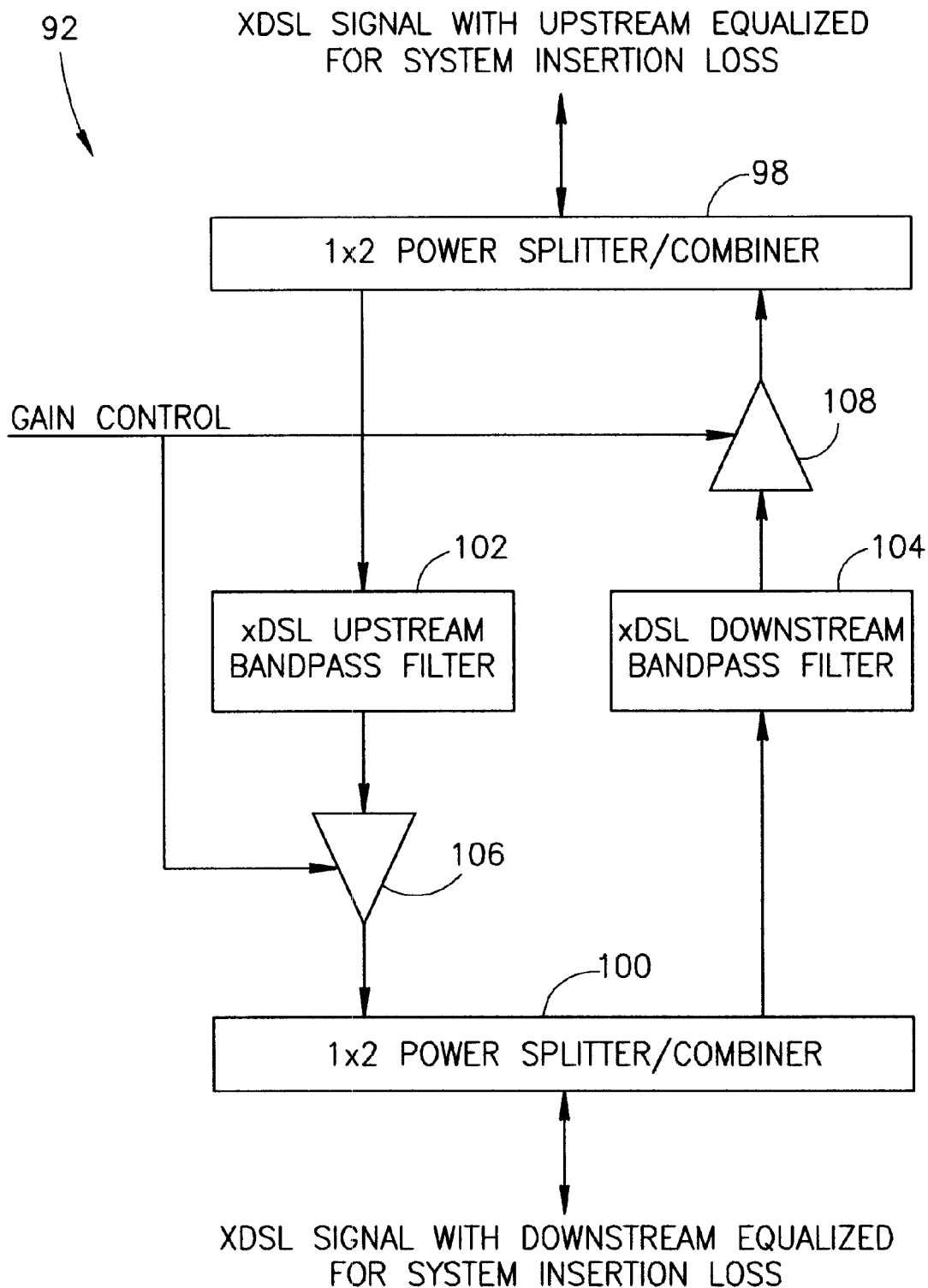
FIG. 7 is a block diagram of a bidirectional bandpass filter for xDSL signals with downstream and upstream equalization constructed in accordance with an embodiment of the present invention to compensate the upstream and downstream xDSL signals at a CPE for insertion loss of the system.

With reference to FIG. 6, a NID 22 provides the functions of frequency up-shifting the downstream xDSL spectrum coming from the network to a frequency above 5 MHz, for example, and down-shifting the upstream xDSL spectrum coming from the CPE. This is preferably accomplished by a mixer 56 located in the NID 22. The up-shifted xDSL signals arrive at and depart from the RF port 58 of the mixer 56. The standard xDSL signals arrive at and depart from the IF port 60 of the mixer 56. The ports 58 and 60 are band-limited by filters 62 and 64, respectively, to remove any out-of-band components generated by the mixer 56 and to keep all unwanted signals from reaching the mixer 56. These filters are preferably passive filters that allow signals to pass in both directions. Active implementations of these filters are depicted in FIG. 7, which is discussed in more detail below, and are used for insertion-loss compensation.

The carrier signal used at the LO port 66 of the mixer 56 is generated from a half-carrier signal originated at the CPE interface device 46 and transmitted to the NID 22. This allows frequency and amplitude of the carrier signal to be adjusted by the CPE interface device 46. As this CPE-generated signal is received at the NID 22, a band-pass filter 68 extracts the half-carrier frequency component and a rectifier 70 full-wave rectifies the signal. The full-wave rectified signal serves two purposes. First, a carrier band-pass filter 72 removes the carrier frequency generated by the full-wave rectifier function, which is then amplified to the correct level before being applied to the mixer LO port 66. Second, the full-wave rectified signal is half-wave rectified and passed through a low-pass filter, as indicated at 74, to generate bias voltages used by the NID 22. These bias voltages are used by the amplifier 76, as well as the mixer 56, depending on the mixer-type. If the LO signal power requirements of the mixer 56 are large, an alternative method can be used in lieu of generating power using half-carrier frequency.

Bi-directional filters 78, 80, 82 and 84 for respective ones of network ports 38 and 40 and the CPE ports 42 and 44 are used to prevent out-of-band signals from reaching the mixer 56. These filters are preferably passive to allow signals to pass in both upstream and downstream directions.

The CPE Interface Device

Figure 8:
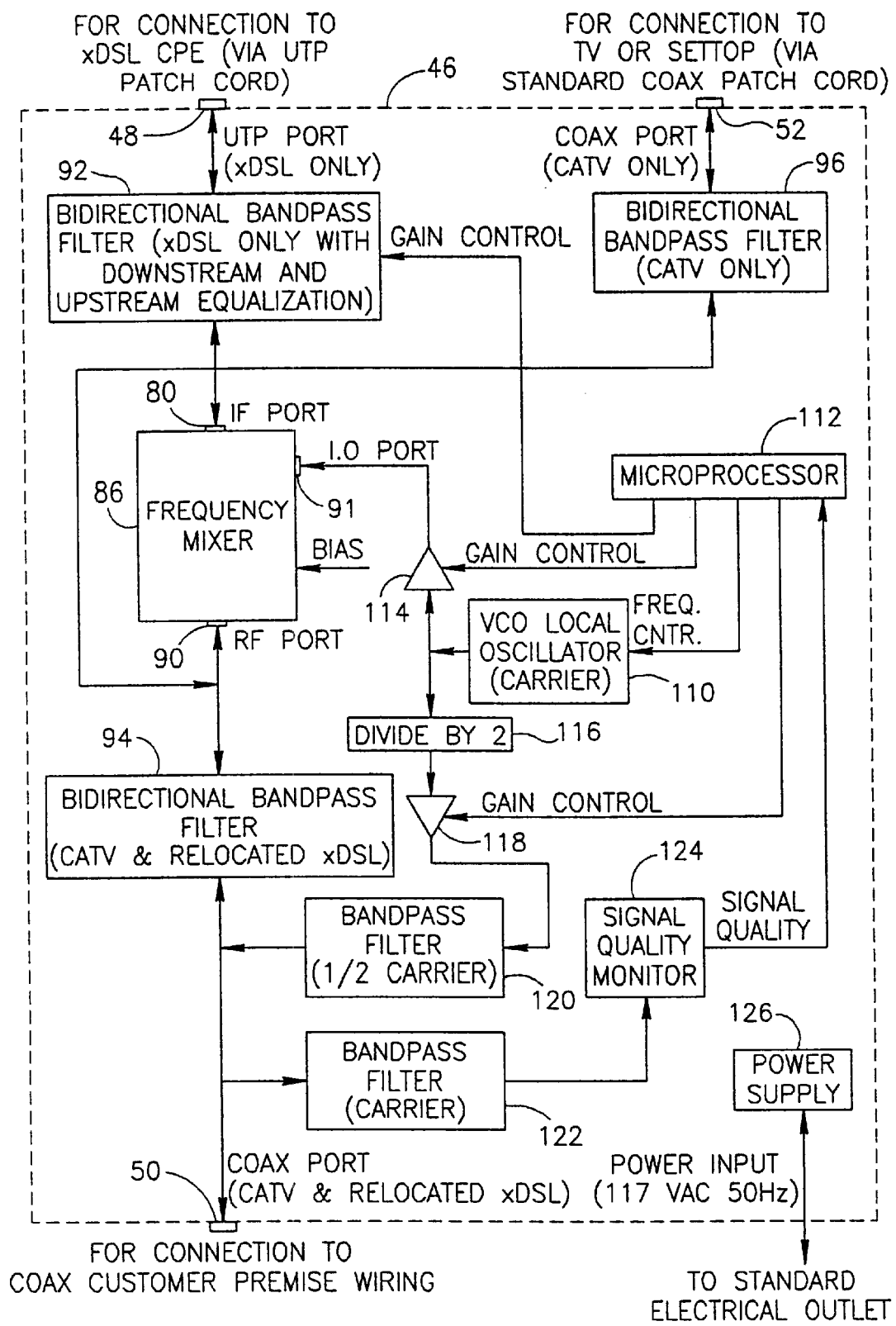
FIG. 8 is a block diagram of a CPE interface device constructed in accordance with an embodiment of the present invention to provide spectral relocation of xDSL signals.

A CPE interface device 46 constructed in accordance with an embodiment of the present invention is depicted in FIG. 8. The CPE interface device 46 provides a number of functions that are similar to those performed by the NID 22. A mixer 86 is used to frequency up-shift the upstream xDSL signal from the CPE, and to frequency down-shift the downstream xDSL coming from the network. As with the NID 22, ports 50 and 52 are provided with band-pass passive filters 96 and 94, respectively, to allow upstream and downstream signals to pass. The filter 92 and equalization for the port 48 that connects to the xDSL CPE terminating device 28 is shown in FIG. 7. The upstream and downstream xDSL signals are amplified independently to compensate for the insertion loss of the system. This is accomplished by separating the upstream and downstream signals with power splitters/combiners 98 and 100 and band-pass filters 102 and 104. Due to the single direction of these filters, they can be active or passive. The amplifiers 106 and 108 are set to compensate for system losses of the CPE interface device 46 and the NID 22, allowing for the xDSL signal to meet level requirements of the xDSL standard.

With continued reference to FIG. 8, the carrier frequency is generated from a voltage controlled oscillator (VCO) 110, under the control of a microcontroller 112, which preferably has pulse-width generated digital-to-analog (D/A) conversion capability. The output of the VCO 110 is amplified, as indicated at 114, before being applied to the mixer 86. The amplitude of the signal is also controlled by the microcontroller 112. The half-carrier frequency is generated by dividing the carrier by two, amplifying, and band-pass filtering, as indicated at 116, 118 and 120, before being applied to the coaxial port 50. The amplitude of the half-carrier signal is also under the control of the microcontroller 112. Alternatively, the frequency doubler circuit of the NID 22 can be used to generate the half-carrier frequency. A band-pass filter 122 and signal quality monitor 124 are used to provide feedback from the up-shifted frequency components to the microcontroller 112 for frequency adjustments and half-carrier or full-carrier amplitude adjustments. Also, from the quality monitor 124, the upstream and downstream compensation circuit can null insertion loss of the end-to-end system A dedicated power-supply 126 is preferably provided in the CPE interface device 46 to generate all required voltages.

The components in the NID 22 and in the CPE interface device 46 preferably have 75 ohm impedance characteristics, including the coaxial cabling. All coaxial wiring connections in the NID 22 and the customer premises 16 are preferably 75 ohm RG-6 or RG-59 coaxial cable with 'F' connectors.

The Mixer

The mixers 56 and 86 are selected to preferably meet a number of criteria For example, each mixer has 75 ohm impedance characteristics because the entire system is preferably a 75 ohm system The mixers 56 and 86 do not require an external power supply. Thus, the NID 22 can remain as simple and reliable as possible. In addition, having an external power supply in the NID 22 is generally not feasible because of the location of the NID 22 at the customer's premises.

Each mixer 56 and 86 preferably allows for a 25 MHz signal to be placed on the corresponding LO port 66 and 91, respectively, for relocation of the xDSL signal The mixer allows for a 20 kHz to 1.1 MHz signal to be placed on the corresponding IF port 60 and 80 to include the entire xDSL spectrum Because data transmission is bi-directional both the mixer 56 in the NID 22 and the mixer 86 in the CPE interface device 46 can support all possible xDSL frequencies. The Mini Circuits ZAD-35HB mixer was selected for mixers 56 and 86 in the model, although other mixers can be used. In addition to meeting the above criteria, this mixer also can be purchased in a package to be used on a printed circuit board for the printed circuit board design of the NID 22 and the CPE interface device 46.

With the mixer 56 and 86 being a passive device, and thus not needing an external power supply, the mixer generally requires the 25 MHz LO signal to be at a power level of 17 dBm+/−3 dBm to drive the internal circuitry. To create the necessary 25 MHz, 17 dBm LO signal for both the mixer 56 at the NID 22 and the mixer 86 at the CPE interface device 46, the LO signal is generated by oscillator circuitry at the customer premises 16 where an external power supply is available. To get the LO signal for the mixer 56 at the NID 22, the LO signal generated at the CPE interface device 46 is preferably transmitted over the coaxial cable linking the customer premises 16 to the NID 22. This signal is transmitted in parallel with the CATV and xDSL signals over this link. To avoid the LO signal, which is at 25 MHz, from interfering with the modulated xDSL signals that are close to the LO signal in frequency, the 25 MHz LO signal being transmitted to the CPE 16 from the NID 22 is divided in frequency to 12.5 MHz at the CPE 16 and then transmitted. At the NID 22, circuitry 70 is provided to multiply the 12.5 MHz signal by two to re-create the 25 MHz carrier for the LO port 66 of the mixer 56 at the NID 22. Accordingly, this configuration allows the NID 22 to remain simple, reliable, and without an external power supply.

There is another advantage to the transmission of the LO signal from the CPE 16 to the NID 22. Since the LO signal for the mixer 56 in the NID 22 is being generated at the CPE 16, the CPE is able to control the operation of the NID 22 by varying the frequency and/or the amplitude of the LO signal going to the NID. This allows the CPE 16 to compensate for external conditions that could effect the performance of the system.

AM Verification

An IF signal between 20 kHz and 1.1 MHz was modulated with a 25 MHz carrier (i.e., an LO signal) to test the amplitude modulation technique described above and to verify the modulated output on the RF ports 58 and 90 of the mixers 56 and 86. To generate the 20 kHz to 1.1 MHz IF signal, a Wavetek Model 134 signal generator, which has a 0 dBm output power level, was used. As stated previously, generation of a 25 MHz, 17 dBm+/−3 dBm signal for the LO port of both mixers 56 and 86 is desired. Most RF signal generators are not capable of producing a 17 dBm signal. The Hewlett Packard 8654B RF signal generator has a maximum output signal strength of 0 dBm. To achieve the necessary 17 dBm on the LO port of the mixer, a −6 dBm loss splttter and a 23 dBm gain amplifier were used in series with the output of the RF signal generator. As the table below shows, the sum of the 0 dBm output of the RF signal generator, the −6 dBm loss of the splitter, and the 23 dBm gain of the amplifier add to create the necessary 17 dBm input to the LO port of the mixer.

| RF Signal Generator Output | 0 dBm |
|---|---|
| Splitter Loss | −6 dBm |
| Amplifier Gain | 23 dBm |
| Total Signal Power to LO port | 17 dBm |

A ZHL-6A-BNC amplifier and a ZFSC-3-4 splitter by Mini Circuits were used, although components from other manufacturers can be used. Both of these items have 50 ohm impedance characteristics and a desirable frequency range. The amplifier uses an external 24 VDC power supply. Since the 17 dBm LO signal is used at both the NID 22 and at the CPE 16, and generating this signal at the CPE 16, as opposed to the NID 22, is preferred, the LO signal for both mixers 56 and 86 is generated at the CPE interface device 46 where an external power supply 126 exists. The NID 22 is therefore implemented as simply as possible so as to be reliable and reduce the likelihood of the local telephone carrier having to make frequent repairs and replacements.

The output of the RF port on the mixer was examined using a spectrum analyzer. Three characteristics were investigated. First, the signal strength of the modulated bands (25 MHz+/− IF frequency) was considered. By examining the signal level, the loss due to the modulation was calculated. Amplitude modulation centers two replicas of the IF signal around the carrier frequency. For example, if the IF frequency is 500 kHz, and this signal is modulated with a 25 MHz carrier, the result is two spectral "bands" at 24.5 MHz and at 25.5 MHz. Ideally, the signal strength of each band is the same as the signal strength of the IF signal. However, due to losses in the mixer, the signal strength of the bands is less than the IF signal strength. These bands are preferably as high in signal strength as possible to ensure that, after demodulation, the original IF signal can be re-created. Also, the signal strength of the modulated "bands" are preferably independent of the IF frequency over the xDSL spectrum.

After measuring the signal strength of these modulated bands, it was concluded that over an exemplary xDSL spectrum of 20 kHz to 1.1 MHz, the signal loss of the modulated bands due to the modulation process by the mixer was approximately −2 dBm from the IF port to the RF port. These results meet the criteria for signal strength and frequency independence. The −2 dBm loss is a very small loss, and is not likely to cause problems in re-creating the signal after demodulation. Also, since the signal strength is independent of the IF frequency, the entire xDSL spectrum can be modulated as described above.

The signal strength of the 25 MHz component was also considered. Ideally, no carrier component is on the RF port; however, there is usually some component of the carrier that is on the RF port of a mixer. This carrier component is preferably minimized as much as possible to prevent interference with the desired modulated "bands". The following table shows measured signal strengths of an unwanted 25 MHz carrier component:

| IF frequency (kHz) | Signal strength of unwanted 25 MHz carrier component (dBm) |
|---|---|
| 20 | −30 |
| 50 | −32 |
| 75 | −35 |
| 100 | −36 |
| 125 | −39 |
| 160 | −42 |
| 240 | −48 |
| 400 | −26 |
| 600 | −24 |
| 800 | −23 |
| 1000 | −22 |
| 1100 | −21 |

As indicated by the table data, the strongest component of the unwanted 25 MHz carrier is at 1.1 MHz, which is the highest of the xDSL frequencies. This component had a signal strength of −21 dBm. The −21 dBm carrier interference is not likely to be strong enough to cause problems. Also, a "notch" filter tuned to the 25 MHz carrier can be used to block this carrier from causing interference with the xDSL modulated bands.

The signal strength of harmonics was considered. When the IF signal is modulated with the carrier or LO signal, there are unwanted harmonics of the modulated "bands". For example, if the carrier is 25 MHz and the IF signal is 500 kHz, then there are harmonics at 25 MHz+/−1000 kHz, 25 MHz+/−1500 kHz, 25 MHz+/−2000 kHz, and at other integer multiples of the fundamental 500 kHz IF signal. These harmonics are unwanted because they can interfere with other xDSL frequencies or "tones", and thus prevent signal re-creation. The following table shows measured signal strengths of unwanted harmonics:

| IF frequency (kHz) | 2nd (dBm) | 3rd (dBm) | 4th (dBm) | 5th (dBm) |
|---|---|---|---|---|
| 20 | −54 | −52 | N/A | −57 |
| 50 | −62 | −50 | N/A | −55 |
| 75 | −57 | −48 | N/A | −54 |
| 100 | −52 | −46 | N/A | −53 |
| 125 | −50 | −46 | N/A | −52 |
| 160 | −48 | −46 | N/A | −52 |
| 240 | −44 | −42 | −56 | −49 |
| 400 | −34 | −38 | −49 | −47 |
| 600 | −32 | −37 | −47 | −46 |
| 800 | −31 | −36 | −45 | −46 |
| 1000 | −30 | −34 | −44 | −46 |
| 1100 | −30 | −34 | −44 | −46 |

The modulated xDSL spectrum was investigated by centering it around 25 MHz on the RF port of the mixer and sending it through a demodulation stage (e.g., sending the modulated signal through the RF port of a second mixer that uses the same carrier as the first mixer on the LO port thereof. The IF output of the second mixer is preferably the same signal as the input of the IF port on the first mixer. However, due to losses and harmonic distortion that occur during the mixing process, the IF signal on the second mixer is not exactly the same as the IF input on the first mixer. The output of the IF port on the second mixer was examined using a spectrum analyzer. Two aspects were considered. First, signal loss from the IF port of first mixer to the IF port of second mixer was considered. This loss is the end-to-end signal loss of the xDSL signal. This loss indicates whether the xDSL signal can be re-created after going through the xDSL spectrum relocation system of the present invention. Also, the IF frequency was varied over the xDSL spectrum to ensure that the loss of the system is independent of IF frequency for all of the xDSL spectrum. The signal loss from the IF port of the first mixer to the IF port of the second mixer was determined to be a −4 dBm loss over the entire xDSL spectrum. This loss is not a significant loss and is not likely to prevent signal re-creation.

Also considered was the signal strength of harmonics since the harmonic content of the IF signal can potentially interfere with other xDSL frequencies or tones. Because the signal has now been demodulated, the IF signal of the second mixer and it's interfering harmonics are centered around 0 Hz. The following table shows the signal strengths of the unwanted harmonics that were measured during the experiment:

| IF frequency (kHz) | 2nd (dBm) | 3rd (dBm) | 4th (dBm) | 5th (dBm) |
|---|---|---|---|---|
| 20 | −52 | −48 | N/A | −56 |
| 50 | −56 | −45 | N/A | −55 |
| 75 | −60 | −46 | N/A | −54 |
| 100 | −56 | −44 | N/A | −52 |
| 125 | −52 | −44 | N/A | −52 |
| 160 | −49 | −43 | N/A | −51 |
| 240 | −44 | −41 | −56 | −49 |
| 400 | −34 | −38 | −49 | −47 |
| 600 | −32 | −36 | −47 | −46 |
| 800 | −32 | −33 | −45 | −45 |
| 1000 | −31 | −34 | −44 | −46 |
| 1100 | −30 | −34 | −44 | −46 |

Bi-directional data transmission was simulated by connecting the IF port of the second mixer to a second Wavetek Model 134 signal generator such that one of the Wavetek signal generators simulates "upstream" data and the other simulates "downstream" data. Three characteristics were of interest. First, simultaneous bi-directional data transmission was verified, which is useful information since xDSL technology employs simultaneous, bidirectional data transmission. With one signal generator transmitting in the "upstream" spectrum (20 kHz to 160 kHz) and the other signal generator transmitting in the "downstream" spectrum (240 kHz to 1.1 MHz), simultaneous bi-directional data transmission is verified. Using a spectrum analyzer, both the "up-stream" and "downstream" spectra can be seen simultaneously on the IF ports of the two mixers.

Second, the symmetry of the signal loss of IF data was verified. Ideally, the signal loss of the "upstream" data is the same as that of the "downstream" data going the opposite way through the system. This is because the system is itself a symmetric system, with components being in a mirrored configuration around the RF port of the first mixer with respect to RF port of the second mixer connection. Since the components and coaxial cabling are essentially matched, and the frequencies in the xDSL spectrum have essentially the same end-to-end loss, the signal loss is independent of direction through the system. Also, the signal loss of the "upstream" and "downstream" data signals each match the −4 dBm loss described above. The signal loss matched that of single direction data transmission and was also symmetric. This investigation was conducted over the entire exemplary xDSL spectrum to ensure frequency independence.

Third, the 25 MHz carrier component in the modulated signal was considered with both mixers performing modulation and de-modulation. The first mixer is modulating the "downstream" signal, while simultaneously de-modulating the "upstream" signal The second mixer is modulating the "upstream" signal, while simultaneously de-modulating the "downstream" signs The fact that both mixers are modulating apparently makes no significant difference in the signal strength of the 25 MHz carrier component of the modulated signal. However, as was mentioned before, a "notch" filter tuned at 25 MHz placed in the modulated signal path can remove interference from this unwanted component.

With regard to frequency doubler circuit and the carrier filtering circuit, the purpose of the frequency doubler 70 is to generate the 25 MHz LO carrier for the NID 22 given a 12.5 MHz input. As stated previously, this is preferably implemented by generating a 12.5 MHz carrier signal at the CPE interface device 46, and then transmuting this carrier with the modulated data signal to the NID 22 over the coaxial link At the NID 22, the 12.5 MHz signal is then converted to a 25 MHz signal by the frequency doubler circuit. The carrier filtering circuit then filters out harmonics generated by the frequency doubler to ensure that the input to the LO port of the mixer on the NID is a 25 MHz sine wave. This frequency doubling and filtering process is preferably also used at the CPE 16 to generate the 25 MHz carrier for the mixer 86. By using the same process at both the NID 22 and the CPE 16, there is greater likelihood that the LO signal at the NID 22 matches the LO signal at the CPE 16. The likelihood of constructive or destructive interference of the modulated signal due to the two mixers using different LO frequencies is therefore decreased.

The basic concept of relocating the xDSL spectrum away from in-home noise can be implemented other ways. For example, the NID device can be located in the CATV pedestal. In that instance, the drop cable from the feeder cable is not in the xDSL path. Typically, the drop cable is of lower performance characteristics than the feeder cable. With this approach, power for the NID is obtained from the 60 Volts (60 Hz) power feed on the CATV system. The CATV provider, however, would have to agree to allowing the xDSL to be transmitted over this coaxial drop. Secondly, the CPE device can be integrated with the xDSL modem or set-top box. This reduces the cost and the complexity of the CPE device both in component count, microprocessor functions, and filtering requirements. Also, instead of using a bidirectional mixer 56 in the NID, the upstream and downstream xDSL spectrums can be separated by filters and modulated and demodulated separately. Also, instead of using customer premise coaxial wiring, only the frequency shifted xDSL signal can be reinserted on the customer premise POTS wiring. However in this implementation, FCC emission limits could be exceeded. Also, another implementation uses wireless communication between the NID and CPE. However, a sufficiently wide consumer frequency band is required to accommodate single-sideband (SSB) modulation of the xDSL signal.

In the illustrated embodiment, a single VCO in the CPE 16 is used. Alternatively, two VCOs can be provided for the NID 22 and the CPE 16, respectively, which can be controlled by the microcontroller 112. Using separate VCOs allows for independent phase adjustments at the LO ports 66 and 91 of the mixers 56 and 86, respectively, to improve insertion loss. The VCO for the NID 22 can be located at the CPE 16 or at the NID 22. If the VCO is located at the NID, control can be provided using a DC bias over the coaxial conductor, thereby providing frequency control and NID power. In accordance with another embodiment of the present invention, single-sideband modulation can be used in lieu of double-sideband modulation to maximize frequency spectrum usage. Insertion losses, however, are likely to increase and require more compensation.

Although the present invention has been described with reference to a preferred embodiment thereof, it will be understood that the invention is not limed to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. A network interface device for receiving downstream signals from a network for transmission to customer premises devices comprising at least one plain old telephone service device and at least one xDSL device and for receiving upstream signals from at least one of said customer premises devices for transmission via said network, said network interface device comprising:

a first port connected to an upstream analog telephone line for receiving said downstream signals from said network, said downstream signals comprising at least one of data signals modulated for transmission on said upstream analog telephone line and plain old telephone service signals;

a splitter device having a first terminal connected to said first port for receiving said downstream signals and being operable to separate said data signals from said plain old telephone service signals and to provide said plain old telephone service signals and said data signals, respectively, to a second terminal and a third terminal thereof;

a second port connected said second terminal of said splitter device for providing said plain old telephone service signals downstream to said at least one plain old telephone service device;

a frequency relocation device connected to said third terminal of said splitter device and operable to modulate said data signals to a selected frequency for transmission downstream with respect to said network interface device as spectrally relocated xDSL signals; and a third port through which said spectrally related downstream xDSL signals are provided to said at least one xDSL device.

2. A network interface device as claimed in claim 1, wherein said third port is configured to be connected to a coaxial conductor for transmitting said spectrally relocated downstream xDSL signals thereon.

3. A network interface device as claimed in claim 2, wherein said at least one xDSL device is operable to generate upstream xDSL signals, said network interface device being configured to receive said upstream xDSL signals via said coaxial conductor and said third port.

4. A network interface device as claimed in claim 3, wherein said network interface device is connected to a customer premises equipment interface device having a first port connected to said coaxial conductor and a second port connected to said at least one xDSL device, said customer premises equipment interface device being operable to modulate said upstream xDSL signals to a selected frequency for transmission as spectrally relocated upstream xDSL signals to said network interface device via said third port thereof and said coaxial conductor, said frequency location device being operable to demodulate said spectrally relocated upstream xDSL signals for transmission as said data signals to said network on said upstream analog telephone line.

5. A network interface device as claimed in claim 4, wherein said network interface device is operable to at least substantially simultaneously modulate said data signals to said selected frequency for transmission as said spectrally relocated downstream xDSL signals, and demodulate said spectrally relocated upstream xDSL signals provided to said third port thereof via said customer premises equipment interface device for transmission as said data signals to said network.

6. A network interface device as claimed in claim 5, wherein said frequency relocation device employs amplitude modulation and amplitude demodulation.

7. A network interface device as claimed in claim 6, wherein said customer premises equipment interface device is operable to generate a carrier signal for transmission to said network interface device via said coaxial conductor, and said frequency relocation device comprises a mixer device, said network interface device being operable to use said carrier signal to control said mixer device to perform said amplitude modulation of said spectrally relocated downstream xDSL signals and said amplitude demodulation of said spectrally relocated upstream xDSL signals.

8. A network interface device as claimed in claim 7, wherein said customer premises equipment interface device comprises a second mixer device for modulating said upstream xDSL signals as said spectrally relocated upstream xDSL signals for transmission to said network interface device and for demodulating said spectrally relocated downstream xDSL signals using said amplitude modulation and said amplitude demodulation, respectively, said carrier signal being operable to control frequency amplitude for said amplitude modulation and said amplitude demodulation performed by said mixer and said second mixer.

9. A network interface device as claimed in claim 5, wherein said customer premises equipment interface device is operable to generate a carrier signal for transmission to said network interface device via said coaxial conductor, said network interface device being operable to use said carrier signal to generate a power signal therefor.

10. A network interface device as claimed in claim 4, wherein said at least one xDSL device is connected to said second port of said customer premises equipment interface device via an analog telephone line.

11. A network interface device as claimed in 4, wherein said customer premises equipment interface device comprises a local oscillator device for operation with a frequency mixer to generate a carrier frequency for modulating said spectrally relocated upstream signals, said customer premises equipment interface device being operable to provide one of the same said carrier frequency and a different carrier frequency to said network interface device via said coaxial conductor for modulating said data signals for transmission as said spectrally relocated downstream xDSL signals.

12. A network interface device as claimed in claim 1, wherein said frequency relocation device employs amplitude modulation to modulate said data signals to said selected frequency.

13. A network interface device as claimed in claim 1, wherein said selected frequency corresponds to a frequency in a selected frequency band which does not coincide with a frequency band corresponding to customer premises electromagnetic interference noise.

14. A network interface device as claimed in claim 4, wherein said network interface device comprises a fourth port, said network device being operable to provide cable broadcast programs to said fourth port, said network interface device further comprising a filter for filtering said cable broadcast systems for transmission from said network interface device via said third port and said coaxial conductor with said spectra relocated downstream xDSL signals.

15. A network interface device as claimed in claim 14, wherein said customer premises equipment interface device comprises a third port connected to at least one downstream cable device, said customer premises equipment interface being operable to filter said cable broadcast programs for transmission via said third port to said downstream cable device.

16. A customer premises equipment interface device for receiving downstream signals from a network for transmission to customer premises devices comprising at least one plain old telephone service device and at least one xDSL device and for receiving upstream signals from at least one of said customer premises devices for transmission via said network said downstream signals comprising xDSL signals modulated for transmission on an analog telephone line with voice signals, said customer premises equipment interface device comprising:
 a first port for receiving said downstream signals from said network, said downstream signals comprising said xDSL signals having been modulated to a selected frequency for transmission to said customer premises equipment interface device as spectrally relocated downstream xDSL signals;
 a mixer device for receiving said spectrally relocated downstream xDSL signals via a first port thereof and for demodulating said spectrally relocated downstream xDSL signals to said xDSL signals; and
 a second port to which said at least one xDSL device is connected for transmitting demodulated said xDSL signals thereto.

17. A customer premises equipment interface device as claimed in claim 16, wherein said at least one xDSL device provides upstream xDSL signals to said mixer device via said second port, said mixer device being operable to modulate said upstream xDSL signals to a selected frequency for transmission upstream to said network as spectrally relocated upstream xDSL signals.

18. A customer premises equipment interface device as claimed in claim 17, wherein said selected frequency of at least one of said spectrally relocated d ram xDSL signals and said spectrally relocated upstream xDSL signals corresponds to a frequency in a selected frequency band which does not coincide with a frequency band corresponding to customer premises electromagnetic interference noise.

19. A customer premises equipment interface device as claimed in claim 17, further comprising a controllable oscillator device for generating a carrier signal and providing said carrier signal to an oscillator port on said mixer device for controlling said mixer device to modulate said spectra relocated upstream xDSL signals and to demodulate said spectrally relocated downstream xDSL signals.

20. A customer premises equipment interface device as claimed in claim 17, further comprising a bidirectional bandpass filter connected between said mixer device and said second port, said bidirectional bandpass filter comprising:
 an upstream xDSL bandpass filter connected to an upstream xDSL amplifier, said upstream xDSL amplifier being operable to compensate said upstream xDSL signals for insertion losses of said customer premises equipment interface device;
 a downstream xDSL bandpass filter connected to a downstream xDSL amplifier, said downstream xDSL amplifier being operable to compensate said xDSL signals in said downstream signals for insertion losses of said downstream device;
 a first splitter and combiner device connected to said upstream xDSL bandpass filter and to said downstream xDSL amplifier, and
 a second splitter and combiner device connected to said upstream xDSL amplifier and to said downstream xDSL bandpass filter, said first splitter and combiner device and said second splitter and combiner device being operable to separate said upstream xDSL signals and said xDSL signals demodulated from said spectrally relocated downstream xDSL signals.

21. A customer premises equipment interface device as claimed in claim 20, further comprising:
 a controllable oscillator device for generating a carrier signal and providing said carrier signal to an oscillator port on said mixer device for controlling said mixer device to perform at least one of modulation of said spectrally relocated upstream xDSL signals and demodulation of said spectrally relocated downstream xDSL signals; and
 a processor device for generating gain control signals for controlling insertion loss compensation by said upstream xDSL amplifier and said downstream xDSL amplifier.

22. A customer premises equipment interface device as claimed in claim 17, further comprising:
 a controllable oscillator device for generating a carrier signal and providing said carrier signal to an oscillator port on said mixer device for controlling said mixer device to perform at least one of modulation of said spectrally relocated upstream xDSL signals and demodulation of said spectrally relocated downstream xDSL signals; and
 a processor device for generating frequency control signals for controlling said controllable oscillator device.

23. A customer premises equipment interface device as claimed in claim 16, wherein said first port is connected to said network via a coaxial conductor.

24. A customer premises equipment interface device as claimed in claim 23, wherein said network provides cable broadcast signals to said downstream device, said customer premises equipment interface device having a third port connected to a cable device via a second coaxial conductor, and being operable to separate said cable broadcast signals from said spectrally relocated downstream xDSL signals for transmission to said cable device.

25. A customer premises equipment interface device as claimed in claim 16, wherein said customer premises equipment interface device is connected to a network interface device via said first port, said network interface device comprising a second mixer device for modulating said spectrally relocated upstream signals, said mixer device and said second mixer device each operating in accordance with an oscillation frequency, said customer premises equipment interface device being operable to generate a carrier signal for controlling said oscillation frequency employed by said mixer device and for transmission to said network interface device via said first port for controlling said oscillation frequency employed by said second mixer.

26. A customer premises equipment interface device as claimed in claim 25, wherein said customer premises equipment interface device is operable to generate a half-carrier frequency signal for transmission to said NID, said network interface device further comprising a full-wave rectifier for rectifier said half-carrier frequency signal for controlling said oscillation frequency of said second mixer and a half-wave rectifier connected to the output of said fall-wave rectifier for generating bias voltages for said NID.

27. A method for reducing the effects of customer premises electromagnetic interference noise on xDSL signals comprising the steps of:

receiving at least one of downstream signals from a network and upstream signals from an xDSL device at said customer premises, said downstream signals comprising at least one of data signals modulated for transmission downstream on an analog telephone line and plain old telephone service signals, said upstream signals comprising data signals modulated for transmission upstream on an analog telephone line;

extracting said data signals from at least one of said downstream signals and said upstream signals;

modulating the extracted said data signals to a selected frequency for transmission as spectrally relocated signals, said selected frequency corresponding to a frequency in a selected frequency band that does not coincide with a noise band corresponding to noise at said customer premises due to electromagnetic interference; and transmitting said spectrally relocated signals in a corresponding one of an upstream and a downstream direction.

28. A method as claimed in claim 27, wherein said customer premises is connected to said network via a NID, said transmitting step comprising the step of transmitting said spectrally relocated signals on a coaxial conductor connecting said customer premises to said NID.

29. A method as claimed in claim 27, further comprising the step of demodulating said spectrally relocated signals to said data signals from at least one of said downstream signals and said upstream signals for transmission to one of said xDSL device and said network, respectively.

30. A method as claimed in claim 29, wherein said extracting step comprises the step of modulating said data signals using amplitude modulation and said demodulating step comprises the step of demodulating said spectrally relocated signals using amplitude demodulation.

* * * * *